Jan. 25, 1966 H. BALDUS 3,230,725
PROCESS FOR SEPARATING HYDROCARBON MIXTURES BY RECTIFICATION
Filed April 12, 1961          2 Sheets-Sheet 1

Inventor
HERBERT BALDUS
By Toulmin & Toulmin
Attorneys

Inventor
HERBERT BALDUS
By Toulmin & Toulmin
Attorneys

# United States Patent Office 3,230,725
Patented Jan. 25, 1966

3,230,725
PROCESS FOR SEPARATING HYDROCARBON MIXTURES BY RECTIFICATION
Herbert Baldus, Munich, Germany, assignor to Gesellschaft fur Linde's Eismaschinen Aktiengesellschaft Zweigniederlassung Hollriegelskreuth, Munich, Germany
Filed Apr. 12, 1961, Ser. No. 102,519
Claims priority, application Germany, Apr. 13, 1960, G 29,452
2 Claims. (Cl. 62—28)

The present invention relates to a process for separating hydrocarbon mixtures, more particularly, to the production of propylene of a high purity by means of a rectification.

During the past few years propylene has become very important for the chemical industry. In the separation of hydrocarbon mixtures, especially in refineries and ethylene planes, crude propylene is obtained that still contains more or less propane and other hydrocarbons. In order to obtain a pure propylene, these other constituents must be separated therefrom. In this respect the use of rectification, as a suitable process, is of particular significance.

No thermodynamic difficulties exist in the production of a mixture of $C_3H_6$—$C_3H_8$ that is to a great extent free from other hydrocarbons. Such $C_3$ mixtures can be obtained, for instance, in gas separation processes for the production of ethylenes. The processes applied here in this invention are in general so formulated that a fraction is obtained which consists only of $C_3$ hydrocarbons and higher boiling constituents, but which is practically free from $C_2$ hydrocarbons. In such cases the crude $C_3$ suitable for separation of $C_3H_6/C_3H_8$ can be obtained as an overhead product from a $C_3/C_4$ column, which separates the $C_4$ hydrocarbons and higher boiling constituents. The processes applied in this manner are known per se.

The rectification of the mixture of propane and propylene is much more difficult. This is apparent from the equilibrium diagram shown in FIGURE 1 wherein the equilibrium ratio curve $y^*=f(x)$ has a substantially flat shape. In this diagram of FIGURE 1, $x$ indicates the mole fraction of the higher boiling compound ($C_3H_8$) in the liquid phase, $y^*$ the mole fraction of the higher boiling compound ($C_3H_8$) in the vapor phase as a function of $x$. If the vapor pressure rate of the higher boiling compound ($C_3H_8$) with respect to the lower boiling ($C_3H_6$) compound is indicated as $\epsilon=\pi_1/\pi_2$, the equilibrium ratio curve $y^*=g(x)$ where $\epsilon=$a constant is set forth by the equation (1) $$y^* = \frac{\epsilon x}{1-(1-\epsilon)x}$$

Equilibrium ratio curves are shown in FIGURE 1 for the mixture $C_3H_6/C_3H_8$ at 3 atmospheres and 14 atmospheres and in comparison for the mixture $C_2H_4/C_2H_6$ at 1000 mm. Hg pressure.

The equilibrium ratio curve $y=f(x)$ always represents the actual composition of the liquid mixture and the vapor in equilibrium with it at certain temperature and pressure conditions. The slope of the curve at each point $x$ represents the quantitative relation between the dripping liquid F and the rising vapor D. The slope of the curve may be expressed as:

$$\frac{dy}{dx} = \frac{F}{D}$$

When $C_3H_6$ and $C_3H_8$ are rectified, the curves $y=f(x)$, coordinated to each rectification stage, can be shown with sufficient accuracy as straight lines because there will be no great differences in temperature along the column resulting from the small differences between boiling points within large pressure ranges. In addition, it is pointed out that no additional vaporizing and condensing processes occur which could displace $F/D$ along a rectification stage in the column because the heats of vaporization differ only slightly from each other. As can be seen from FIGURE 1, the equilibrium curves of $C_3H_6/C_3H_8$ differ only slightly at 3 atmospheres and 14 atmospheres. Further, both curves are very flat, since the value of $s$ is about 0.8. The resulting straight lines have a high slope and consequently the relation $F/D$ is only slightly smaller than 1 in the upper section of the column. This means that the separation of $C_3H_6$ and $C_3H_8$ requires large exchanges of energy within the column and that it is therefore expensive.

In separating propylene and propane by rectification, the operational pressure is generally so selected that the condenser of the column can be cooled by cold water from an external source. In a pure separation of propane and propylene a temperature of the heating unit of about 60° C. will be sufficient. This means that a source of warm water can be used as a heating medium. Such a process of separating $C_3H_6/C_3H_8$ has the advantage that it can be carried out without additional expenses for apparatus. However, this advantage may be offset by the necessity of supplying cool water, warm water or vapor. This necessity is of great importance when great quantities of pure propylene are to be produced from mixtures which are rich in propane.

It has therefore been proposed to operate such a rectification column by circulating the propylene in such a manner that the pure propylene is brought to a pressure at which it condenses by an indirect heat exchange at the bottom of the rectification column. The sump liquid then evaporates and the condensate is used for cooling the head of the column. This rectification stage is generally carried out subsequent to several previous stages. Therefore, it appeared to be advantageous from an energy viewpoint to conduct each stage of rectification at a pressure lower than that under which the gas to be separated emerges from a previous separation stage. Low operational pressures are favorable for separating hydrocarbon mixtures, especially for separating such mixtures to $C_3$ and higher hydrocarbons.

It is therefore the principal object of this invention to provide a novel and improved process and apparatus for the production of propylene.

It is another object of this invention to provide an improved process and apparatus for producing propylene of a high purity by rectification.

The present invention is based on the unexpected discovery that the separation of $C_3$ hydrocarbons to propylene and propane becomes more advantageous from an energy standpoint as higher operational pressures are chosen. Accordingly, the present invention essentially comprises the production of pure propylene from at least two rectification stages, wherein at least one stage has a circulation with a separation product obtained in the same, whereby the $C_3$ hydrocarbons are obtained in one stage and propylene and propane are separated in the following stage. It is a feature of this invention that the last rectification stage is carried out at a pressure higher than 10 atmospheres, independently of the operational pressure of the other parts of the apparatus, and that the $C_3$ hydrocarbons, preferably liquid ones, emerging from the previous stage are brought to this mentioned pressure.

Propylene as well as propane can be used as a circulating agent. Both possibilities are specifically described.

Pressures of from 15 to 25 atmospheres are especially suitable therefor.

Other objects and advantages of this invention will be apparent upon reference to the accompanying description when taken in conjunction with the following drawings, wherein FIGURE 1 is a graph illustrating an equilibrium curve of mixtures of $C_3H_6$—$C_3H_8$ and $C_2H_4$—$C_2H_6$ at different pressures;

Specific embodiments of this invention will next be described by reference to the aforementioned drawings wherein like reference symbols indicate the same parts throughout the various views.

Figure 1:
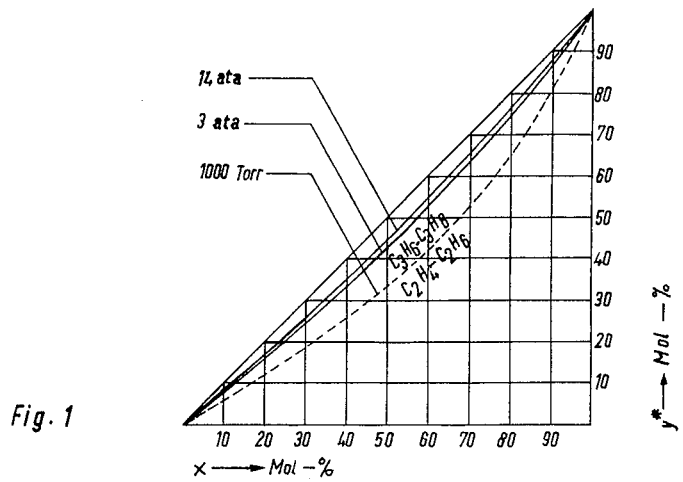

Returning to FIGURE 2, there is shown schematically an apparatus operating by open propylene circulation. A hydrocarbon mixture having three and more carbon atoms per molecule is supplied through a conduit 1 to a rectification column 2 and separated in the same into a sump product containing hydrocarbons of four and more carbon atoms. The sump product is removed from the column through a conduit 3. There is also formed a vaporous $C_3$ mixture consisting of propylene and propane which is decanted from the head of the column through a conduit 4. This $C_3$ mixture overhead product is at least partially condensed in a condenser 5. One part of the resulting condensate is returned to the column 2. Another part is compressed in a compressor 6 to a pressure of ten atmospheres or higher, which prevails in a $C_3$ column 7, and is supplied to the column 7 through a conduit 14.

Pure propane accumulates in the bottom of the column 7 and is removed through conduit 8. The overhead product consisting of pure propylene emerges from the column through a conduit 9 and is then warmed in a supercooling counterflow condenser 10. The warmed propylene is then compressed in a compressor 11 to the pressure that is necessary for causing the propylene in a heater 12 at the bottom of column 7 to condense at the same temperature at which the sump liquid evaporates. At an operational pressure $P_u$ of approximately 20 atmospheres this pressure $P_E$ is about 26 atmospheres.

The compressed propylene is precooled in a water cooler 13 prior to its being condensed in the heater unit 12 and exhausted through a conduit 15. The propylene required for the circulation is removed from the condensate by conduit 16. This propylene is cooled in the super-cooling counterflow condenser 10 and expanded into the head of column 7 by means of a valve 17. The pure propylene obtained from this process is drawn off from the apparatus through a conduit 18.

Figure 2:
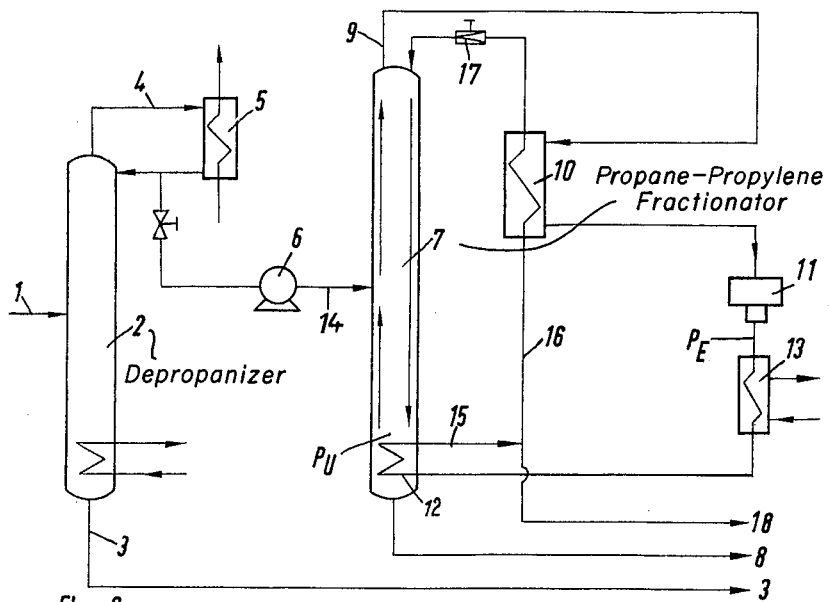
FIGURE 2 is a schematic representation of the apparatus according to this invention and employing an open propylene circulation.
Figure 3:
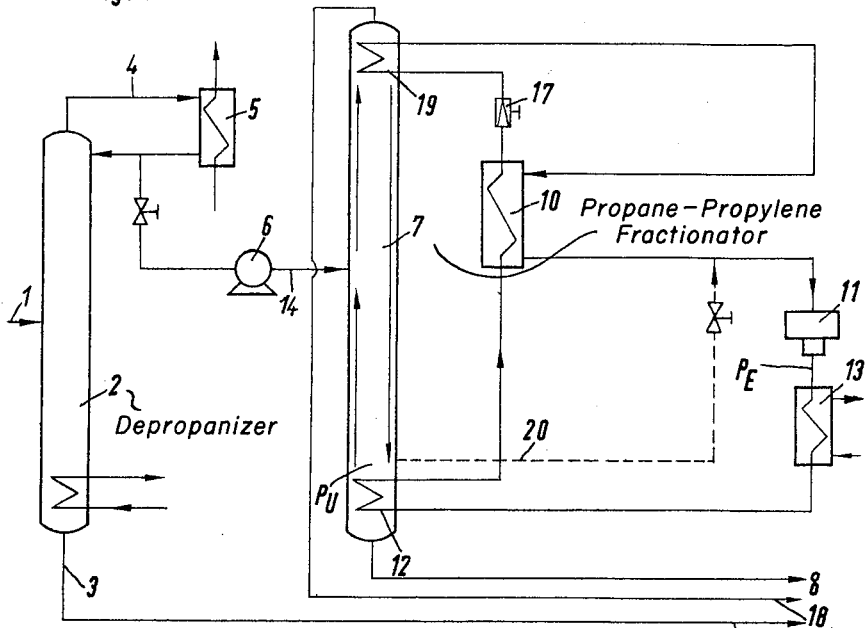
FIGURE 3 is a schematic representation of the apparatus according to this invention having a closed circulation of propane.

Proceeding next to FIGURE 3, there is shown an apparatus in which a closed circulation of propane is used. The apparatus of FIGURE 3 can also be operated with an open circulation somewhat similar to the operation of the apparatus of FIGURE 2. The apparatus of FIGURE 3 is similar to that of FIGURE 2 but additionally comprises a cooling unit 19 positioned in the head of the column 7. The cooler 19 is connected in series with the expansion valve 17 and condenses the propane which was evaporated in the heating unit 12. Losses in the recycled propane can be replaced through a conduit 20 indicated by dashed lines. Pure propylene is drawn off of the top of the column 7 through the line 18 without being passed through the counterflow condenser 10.

The theoretical considerations on which this invention is based can be described briefly. The problem of rectifying a propylene-propane mixture involves so many parameters, some of which are interdependent, as for instance, pressure, temperature, composition of gas, purity, yield, etc., that it is necessary to keep some of them constant in order to obtain comparable and significant results which can be applied in practice. Such results can be readily obtained by making several assumptions to simplify the relationship between the several factors. These assumptions will next be described.

(1) It is always assumed that $(F/D)_0 = C \cdot (F/D)_{min}$, where $C$ = constant.

The relationship $(F/D)_{min}$ is defined as the slope of the equilibrium cure straight line between the point $x = Y = 0$ and the point of the equilibrium curve having the composition in the column of the charging mixture $y = y_E = y^*$. Thus, a base number $n \to \infty$ corresponds to the slope $(F/D)_{min}$. Accordingly, the actual reflux ratio $(F/D)_0$ in the upper section of the column is assumed to be a function of $y_E$ which is the propane concentration of the charging mixture, or $(F/D)_0 = f(y_E)$. As a result, all of the following indicated values and curves correspond to rectification columns having theoretical base numbers which only slightly differ from each other. Moreover, the constant $C$ is so chosen that base numbers result which are technically acceptable. In this sense the values for the energy requirement numbers indicated in FIGURES 4 and 5 should be considered as minimum values.

(2) The yield $A$ of pure propylene is in all the cases 90%, consequently $A$ = constant = 0.9.

(3) The purity of the produced propylene is 99.9%.

(4) The charging mixture contains only $C_3H_6$ and $C_3H_8$. Contents of $C_2$ hydrocarbons and lower boiling constituents as well as $C_4$ hydrocarbons and higher boiling constituents are assumed to be zero.

(5) The exchange curve is a straight line.

(6) 1000 Nm.³h. $C_3H_6/C_3H_8$ mixtures are always treated.

Figure 4:
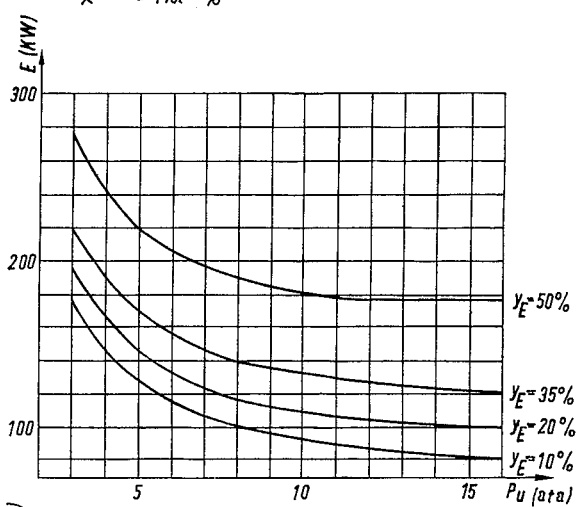
FIGURE 4 is a graph showing an equilibrium curve plotted against electrical energy as a function of the operational pressure $P_u$ in an open propylene circulation.

Proceeding next to FIGURE 4, there is shown in graph form the required electrical energy with respect to the operational pressure $P_u$ in an open propylene circulation. The several parameters $y_E$ indicate the content of $C_3H_8$ in the crude gas in percent by mole. These test results were obtained by using the equilibrium curves plotted by computing points using Equation 1.

Figure 5:
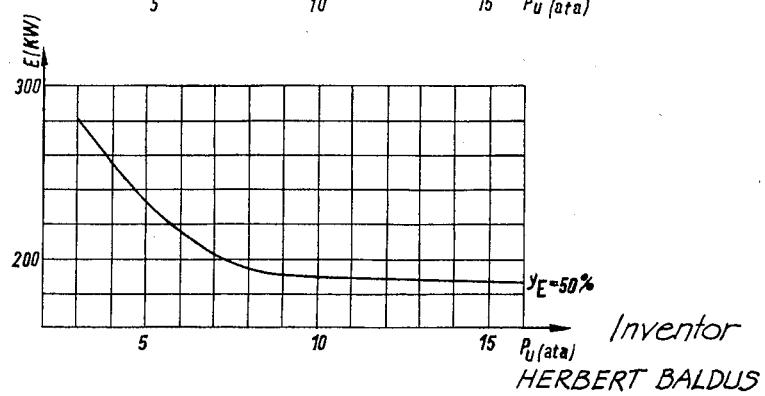
FIGURE 5 is a graph similar to that of FIGURE 4 but for a closed propane circulation.

FIGURE 5 shows also in graph form the results of these tests by closed propane circulation and showing only one parameter.

Thus it can be seen that the present invention discloses an efficient method and apparatus for producing propylene.

The following is an operational example containing data on the processes carried through by means of the apparatus shown in FIGURES 2 and 3.

*Example I*

A hydrocarbon mixture of 1500 Nm.³/h. containing 43.4% $C_3H_6$, 23.3% of $C_3H_8$, 20.0% of $C_4$ and 13.3% of $C_5$ is supplied through conduit 1 to the rectification column 2. This mixture is separated in the column 2 into a $C_{4+}$-fraction of 500 Nm.³/h. (1% of $C_3H_8$, 59% of $C_4$, 40% of $C_5$) which can be removed through conduit 3, and into a $C_3$-fraction of 1000 Nm.³/h. (65.0% of $C_3H_6$, 34.5% of $C_3H_8$, 0.5% of $C_4$), which is decanted through conduit 4. The pressure is column 2 is 6 atmospheres, the temperature of the head product ($C_3$-fraction) is $+3°$ C., and the temperature of the sump product ($C_{4+}$-fraction) is $+70°$ C. In the event the $C_{4+}$-fraction still contains polymerizable components (as, for instance, butadiene), it would be appropriate to maintain the pressure in column 2 at the above-mentioned value of 6 atmospheres or lower, in order to avoid excessive temperatures in the sump product of the column and to reduce the risk of polymerizations.

The head product from column 2 (1000 Nm.³/h. C₃-fraction) is partially condensed in condenser 5. A portion of the condensate is compressed to 15 atmospheres in the compressor 6 and supplied through conduit 14 to the C₃H₆ column 7. A C₃H₈-fraction of 414 Nm.³/h. (15.7% of C₃H₆, 83.2% of C₃H₈, 1.2% of C₄) accumulates in the bottom of column 7 and is removed through conduit 8. The head product consisting of pure propylene emerges from column 7 through conduit 9, is then heated in the supercooling counterflow condenser 10 and thereafter compressed to 20 atmospheres in compressor 11. The propylene, being under a pressure of 20 atmospheres at a temperature of +48° C., is liquefied in the heater 12, positioned in the bottom of column 7, whereas the sump liquid (C₃H₈) evaporates in the column under a pressure of 15 atmospheres at a temperature of +43° C. That part of the propylene which corresponds to the quantity of the product (in this case 586 Nm.³/h., 99.9% of C₃H₆, 0.1% of C₃H₈) is tapped from conduit 18 after it has been liquefied in the heater unit 12, whereas the quantity of propylene necessary for the reaction in the column is returned to the column through conduit 16. In the mentioned example about 8000 Nm.³/h. of propylene must be condensed to 20 atmospheres by the circulation compressor 11. The temperature in the head of column 7 is about +34° C. The expenditure of energy as can be seen in FIGURE 4 is about 122 kw. at an operational pressure of 15 atmospheres and a C₃H₈ content of 35% of the C₃ mixture introduced through conduit 14.

Should the rectification in column 7 be carried out at a lower pressure, of for instance 5 atmospheres, which in principle would be possible, there would be a greater expenditure of energy on account of the higher pressure at compressor 11. The energy, as can be seen in FIGURE 4, would be 170 kw. at 5 atmospheres and 35% of C₃H₈ in the starting mixture entering through conduit 14.

There are analogous data in case the process is carried out with a propane circulation as illustrated in FIGURES 3 and 5.

Certain traces of components that might be contained in the C₃ mixture (conduit 14 to column 7) as, for instance, water, sulphur compounds, higher acetylenes, etc. can be eliminated in separate steps either prior to or after the mentioned process by known processes such as, for instance, water through adsorption, sulphur compounds through washings.

It will be understood that this invention is susceptible to further modification and, accordingly, it is desired to comprehend such modifications within this invention as may fall within the scope of the appended claims.

What I claim is:

1. A process of producing propylene from a mixture of hydrocarbons having three and more carbon atoms per molecule, which process comprises:
    (1) fractionally distilling said mixture in a first distillation column operating at a pressure lower than 10 atmospheres, to obtain a C₃-distillate essentially consisting of propane and propylene; and
    (2) fractionally distilling said C₃-distillate in a second distillation column operating at a pressure between 10 and 25 atmospheres, to obtain a bottoms of propane and a head product of gaseous propylene, and wherein:
        (a) said gaseous propylene head product is passed through a heat exchanger whereby said gaseous propylene is heated by indirect heat exchange contact,
        (b) said heated gaseous propylene from (a) is compressed to a pressure which is higher than the operating pressure of the second distillation column,
        (c) said compressed heated gaseous propylene from (b) is passed through the bottom of the second distillation column, as indirect reboiler heating fluid, whereby said propylene is condensed into a liquid,
        (d) a portion of said condensed liquid propylene from (c) is passed through the heat exchanger of step (a) in indirect and counter-current heat transfer contact with the gaseous propylene of step (a), whereby the liquid propylene is cooled, and
        (e) said cooled liquid propylene portion from (d) is then reduced in pressure and refluxed to the top of said second distillation column.

2. A process of producing propylene from a mixture of hydrocarbons having three and more carbon atoms per molecule, which process comprises:
    (1) fractionally distilling said mixture in a first distillation column operating at a pressure lower than ten atmospheres, to obtain a C₃-distillate essentially consisting of propane and propylene; and
    (2) fractionally distilling said C₃-distillate in a second distillation column operating at a pressure between 10–25 atmospheres, to obtain a bottoms of propane and a head product of gaseous propylene, and wherein said propane is employed as the heating medium in a vapor compression system for said second column by the following steps:
        (a) gaseous propane is passed through a heat exchanger whereby said gaseous propane is heated by indirect heat exchange contact,
        (b) said heated gaseous propane from (a) is compressed to a pressure which is higher than the operating pressure of the second distillation column,
        (c) said compressed heated gaseous propane from (b) is passed through the bottom of the second distillation column, as indirect reboiler heating fluid, whereby said propane is condensed into a liquid,
        (d) said condensed liquid propane from step (c) is passed through the heat exchanger of step (a) in indirect and counter-current heat transfer contact with the gaseous propane of step (a) whereby the liquid propane is cooled,
        (e) reducing in pressure said cooled liquid propane from step (d),
        (f) passing said propane from step (e) through the top of said second distillation column in indirect heat transfer contact, whereby said liquid propane is evaporated into a gas, and
        (g) passing said gaseous propane from step (f) through said series of steps (a) to (f) in a closed cycle.

References Cited by the Examiner

UNITED STATES PATENTS

| | | | |
|---|---|---|---|
| 2,274,094 | 2/1942 | Rupp | 62—31 X |
| 2,534,274 | 12/1950 | Kniel | 62—40 X |
| 2,577,701 | 12/1951 | Deming et al. | |
| 2,600,110 | 6/1952 | Hachmuth | 62—31 X |
| 2,619,814 | 12/1952 | Kniel | 62—40 X |
| 2,629,239 | 2/1953 | Gantt | 62—41 X |
| 2,645,104 | 7/1953 | Kniel | 62—26 X |
| 2,700,282 | 1/1955 | Roberts | 62—30 X |
| 3,000,188 | 9/1961 | Greco | 62—31 X |
| 3,002,358 | 10/1961 | Kierl | 62—28 X |
| 3,028,332 | 4/1962 | Forbes | 62—23 X |

NORMAN YUDKOFF, *Primary Examiner.*

RICHARD A. O'LEARY, *Examiner.*